United States Patent Office 3,703,503
Patented Nov. 21, 1972

3,703,503
THIOUREA PSEUDOCUMENE ADDUCT
Philmore M. Scudder, Havertown, Pa., assignor to Sun Oil Company, Philadelphia, Pa.
No Drawing. Filed Aug. 13, 1969, Ser. No. 849,878
Int. Cl. C07b *21/00*
U.S. Cl. 260—96.5 T                          7 Claims

ABSTRACT OF THE DISCLOSURE

Pseudocumene (1,2,4-trimethylbenzene) will form a stable adduct with thiourea. This phenomena can be used to separate pseudocumene from a mixture of $C_9$ benzenoid hydrocarbons containing more than 88 weight percent of pseudocumene.

BACKGROUND OF THE INVENTION

This invention relates to a novel composition of thiourea and pseudocumene which permits the separation of pseudocumene from other $C_9$ benzenoid hydrocarbons. Specifically, this invention relates to a novel stable adduct of thiourea with pseudocumene. This stable adduct permits the separation of pseudocumene from other $C_9$ benzenoid hydrocarbons which are near its boiling point. To form this stable adduct of thiourea with pseudocumene, it is necessary that pseudocumene be initially present in a concentration greater than 88 weight percent.

Pseudocumene is a desirable intermediate in the chemical industry for conversion to carboxylic acids and trimellitic anhydride. The latter is a useful intermediate for coatings, plastics, polymers and adhesives. Additional information as to end uses of pseudocumene is given in Polymethylbenzenes by H. W. Earhart published by Nayes Development Corporation (1969), U.S. Library of Congress Catalog Card No. 74–75387.

Hydrocarbon fractions containing pseudocumene are readily available in petroleum refineries but these fractions contain large amounts of other $C_9$ aliphatic aromatics such as trimethylbenzenes, ethylxylenes, propylbenzenes, and methylvinylbenzenes, etc. These contaminating aromatics can be present as a mixture of all of their isomers. Because of the closeness of the boiling points, it is difficult to obtain a pseudocumene fraction containing more than about 80 to 90% pseudocumene by fractionation. An easier method of producing pseudocumene in higher concentrations is desired.

SUMMARY OF THE INVENTION

It has now been discovered that thiourea will form a stable adduct with pseudocumene. Thus pseudocumene can be separated from $C_9$ benzenoid hydrocarbons containing more than 88 weight percent pseudocumene. Prior to this invention the possibility of such an adduct formation and such a separation was not recognized.

DESCRIPTION

According to this invention thiourea is contacted with pseudocumene to form an adduct of thiourea with pseudocumene and the resulting adduct is isolated. A composition of matter is thereby obtained which comprises a crystalline adduct of the thiourea and the pseudocumene. The formation of the adduct occurs either directly upon contacting of the components, or upon cooling of the mixture obtained by the contacting. The resulting mixture is treated for the separation of the adduct from the liquid material. Conventional separation techniques such as filtration, centrifuging, etc., can be employed.

The thiourea can be added as a solution in a solvent. Examples of suitable solvents are alkanols having up to 3 carbon atoms per molecule. Methanol is a preferred solvent, but ethanol and propanols are operable. Anhydrous solvents, or aqueous solvents containing for example up to 25 volume percent of water or more, can be employed. Other solvents which can be used are dialkylketones containing 3 to 4 carbon atoms, e.g., acetone and methylethylketone. The thiourea can be used as a solution in the solvent, or as a solid granular material wetted with the solvent. The use of an added solvent for the thiourea is not essential.

The thiourea-pseudocumene adduct can also be formed in a liquid which does not form an adduct with thiourea. For example, thiourea can be added to a mixture of pseudocumene and n-decane. The thiourea does not form an adduct with n-decane. If the concentration of pseudocumene in the mixture is more than 88 weight percent, the thiourea will form an adduct with the pseudocumene. The resulting adduct then can be removed from the pseudocumene and n-decane mixture by conventional separation techniques.

Also, it has been found that pseudocumene forms an adduct with thiourea whereas other $C_9$ benzenoid hydrocarbons will not. It therefore is possible to concentrate pseudocumene from a mixture of $C_9$ benzenoid hydrocarbons by selectively adducting the pseudocumene with thiourea, separating the solid adduct from the treated liquor and decomposing the separated adduct by known techniques to recover separately the thiourea and the concentrated pseudocumene.

Upon separation of the adduct from the liquid, the adduct can be decomposed by known techniques to recover the hydrocarbon from the adduct. A typical procedure involves contacting the adduct with water at an elevated temperature, with subsequent separation of an aqueous solution of thiourea from the pseudocumene liberated from the adduct. Various other decomposition procedures are known in the art of thiourea adduct formation and the known procedures are generally suitable for use according to the invention.

The hydrocarbon which is recovered from the adduct is concentrated with respect to pseudocumene. Further concentration of pseudocumene can be obtained by the performing of additional stages of thiourea adduct formation, separation and decomposition. However, it is possible that the concentration of pseudocumene obtained from certain $C_9$ benzenoid hydrocarbons might be limited to some concentration less than 100% because of "dragging." As discussed by Von W. Shclenk Jr. in his paper Die Thioharnstoff—Addition organischer Verbindungen appearing in Liebigs Annalen vol. 573 (1951), dragging is the phenomenon where one hydrocarbon which when forming an adduct with thiourea drags along with it another hydrocarbon which by itself does not form an adduct with thiourea.

The term $C_9$ benzenoid hydrocarbons herein refers to the following benzenes: 1-methyl-2-vinyl; 1-methyl-3-vinyl; 1-methyl-4-vinyl; 1-propenyl; allyl; isopropenyl; cyclopropyl; 1,2,3-trimethyl; 1,2,4-trimethyl; 1,3,5-trimethyl; 1-methyl-2-ethyl; 1-methyl-3-ethyl; 1-methyl-4-ethyl; propyl; isopropyl; 1-methyl-4-ethynyl; as well as phenyl propadiene; 1-phenyl-1-propyne, 3-phenyl-1-propyne, indan, and indene.

Typically the amount of thiourea employed in the process of the invention is in the range from 0.5 to 10 moles per mole of pseudocumene. Other amounts can be employed if desired. The thiourea can be employed as a concentrated solution in methanol, a typical concentration being 75% of the saturated concentration.

Thiourea can be contacted with pseudocumene or a mixture of $C_9$ benzenoid hydrocarbons at a temperature from 10° C. to 65° C., although other temperatures can be employed. The subsequent separation of the adduct which is formed can be performed either at the same temperature as the initial contacting or at some other temperature, usually a lower temperature. Typically the temperature of the separation is in the range from −25° C. to 25° C. although temperaures above 0° C. are more typical. Other temperatures can be employed.

The invention is applicable to feed stocks which contain more than 88 weight percent of pseudocumene, whether from petroleum, coal tar or other sources.

EXAMPLES

Twenty-five milliliters of pseudocumene were mixed with 150 milliliters of saturated methanol-thiourea solution. Immediately white crystalline needle-like crystals precipitated. The precipitate was redissolved by stirring and the application of heat. The warm solution was placed in an ice bath, and again white crystalline needle-like crystals precipitated. The precipitate was collected in a suction filter, washed with isooctane and dried under vacuum at room temperature. Some of the precipitate was placed in warm water. A hydrocarbon layer formed on the surface of the water.

Samples of the pseudocumene-thiourea adduct were analyzed on an X-ray diffractometer employing CuKα radiation. Also analyzed, for comparative purposes, were durene-thiourea adduct and thiourea. The durene-thiourea adduct was prepared in the same manner described for the pseudocumene-thiourea adduct. The results of these analyses are shown in Table I. The X-ray patterns clearly show that a crystalline substance—thiourea-pseudocumene adduct—has been formed.

TABLE I

X-ray diffraction patterns "d", A. values and relative intensities

| Pseudocumene thiourea adduct | | Thiourea | | Durene-thiourea adduct | |
|---|---|---|---|---|---|
| d, A. | I/I$_{100}$ | d, A. | I/I$_{100}$ | d, A. | I/I$_{100}$ |
| 7.80 [1] | 31 | | | 7.61 | 10 |
| 7.62 [1] | 18 | | | | |
| 5.86 [1] | 11 | | | 5.80 | 20 |
| 4.62 | 15 | 4.62 | 7 | | |
| 4.55 [1] | 15 | | | 4.49 | 15 |
| 4.46 | 43 | 4.48 | 40 | | |
| 4.42 [1] | 100 | | | 4.44 | 100 |
| 4.355 [1] | 17 | | | 4.31 | 50 |
| 4.287 | 23 | 4.29 | 100 | | |
| 3.986 | 5 | | | | |
| 3.900 | 17 | | | 3.85 | 4 |
| 3.837 | 16 | 3.83 | 70 | | |
| 3.682 [1] | 8 | | | 3.64 | 6 |
| 3.500 [1] | 26 | 3.51 | 40 | 3.51 | 50 |
| 3.386 [1] | 17 | | | 3.37 | 40 |
| 3.148 | 18 | 3.15 | 40 | | |
| 3.094 | 13 | 3.10 | 30 | | |
| 2.937 | 10 | 2.95 | 15 | 2.93 | 6 |
| 2.858 | 9 | 2.86 | 30 | | |
| 2.750 | 3 | 2.75 | 5 | | |
| 2.68 | 5 | | | | |
| 2.529 | 6 | 2.54 | 15 | | |
| 2.478 | 6 | 2.48 | 15 | | |
| 2.040 | 8 | 2.34 | 3 | | |
| | | 2.32 | 5 | | |
| 1.829 | 5 | 2.16 | 3 | | |
| | | 2.04 | 3 | | |
| 1.768 | 4 | 1.93 | 7 | | |
| | | 1.87 | 5 | | |
| | | 1.83 | 5 | | |
| | | 1.79 | 5 | | |
| | | 1.77 | 5 | | |

[1] Maxima attributed to an adduct structure.

For infrared analysis of pseudocumene, pseudocumene-thiourea adduct, thiourea, and durene-thiourea adduct also indicated the formation of the pseudocumene-thiourea adduct.

The thiourea-pseudocumene adduct is stable. The X-ray patterns shown in Table I were obtained about a week after the adduct was prepared. About 6 months after the X-ray patterns shown in Table I were obtained, the same sample, which was kept in a closed vial at room temperature, was analyzed by the same X-ray procedure. A comparison of the X-ray patterns indicated only a slight shifting in the d values insufficient to appear significant. Selected d values obtained 6 months later are compared in Table II with the d values obtained a week after the preparation of the thiourea-pseudocumene adduct. Selected d values are reported for the sake of brevity. The patterns indicate the stability of the adduct product upon standing at ambient temperature.

TABLE II

Stability of pseudocumene-thiourea adduct X-ray diffraction patterns "d", A. values and relative intensities

| Selected patterns [1] one week after preparation | | Selected patterns [1] 6 months after preparation | |
|---|---|---|---|
| d, A. | I/I$_{100}$ [2] | d, A. | I/I$_{100}$ [2] |
| 7.80 | 31 | 7.78 | 24 |
| 5.86 | 11 | 5.81 | 24 |
| 4.55 | 15 | 4.55 | 53 |
| 4.42 | 100 | 4.41 | 100 |
| 4.355 | 17 | 4.35 | 30 |
| 3.682 | 8 | 3.678 | 16 |
| 3.500 | 26 | 3.498 | 90 |
| 3.386 | 17 | 3.377 | 41 |

[1] Selection made for sake of brevity.
[2] Relative intensities are believed to be influenced by orientation of crystallite in the sample holder.

The example described above was repeated with other $C_9$ alkyl aromatics in place of pseudocumene and no precipitate was formed. These other $C_9$ aromatics were n-propylbenzene, mesitylene, o-ethyl-toluene, m-ethyltoluene, hemimellitene and cumene.

A mixture of 91.95 weight percent pseudocumene and 9.05 weight percent n-decane was treated with a saturated methanol-thiourea solution. After the thiourea treatment was performed twice, the residual mixture contained 88 weight percent pseudocumene and 12 weight percent n-decane. However, despite two additional treatments the concentration of pseudocumene in the pseudocumene-n-decane mixture could not be reduced below 88 weight percent.

A mixture of 70 weight percent pseudocumene and 30 weight percent of mesitylene was treated with a saturated methanol-thiourea solution. The crystals that precipitated were separated, washed with a suitable solvent and vacuum dried at room temperature. The crystals were placed in warm water but no hydrocarbon layer formed indicating no adduct formation. This is another illustration that only above a certain concentration of pseudocumene will a thiourea-pseudocumene adduct form.

Ten milliliters of an alkyl aromatic refinery stream having the composition shown in the following Table III were contacted with 50 milliliters of saturated methanol-thiourea solution. Some precipitate was formed. The combination was heated with agitation and allowed to cool. Long needle-like crystals precipitated. These crystals were separated, washed with isooctane and vacuum dried at room temperature. The crystals were placed in warm water. The hydrocarbon layer formed on the water. The hydrocarbon was separated and analyzed by gas chromatography. The hydrocarbon contained 96.68 weight percent pseudocumene compared to the aromatic refinery stream which analyzed 94.0 weight percent pseudocumene (Table III). The hydrocarbon containing 96.68 weight percent pseudocumene was treated again with thiourea, but no change occurred in the concentration of the pseudocumene in the hydrocarbon obtained from the decomposition of this second adduct. The composition of the hydrocarbon obtained from the decomposition of the second adduct is shown in Table III.

TABLE III

| | Weight percent | |
|---|---|---|
| Components | Refinery stream | Pseudocumene concentrate |
| Pseudocumene | 94.0 | 96.68 |
| 1,3,5-trimethylbenzene | 2.05 | 0.18 |
| 1,2,3-trimethylbenzene | 3.85 | 3.14 |
| Total | 99.90 | 100.00 |

Apparently, the reason that a higher pseudocumene concentration was not obtainable from this particular $C_9$ alkyl aromatic mixture was the heretoforementioned dragging.

Substantially equivalent results were obtained when solvents other than methanol were used.

The invention claimed is:

1. The adduct of thiourea and pseudocumene.
2. Process for separating pseudocumene which comprises: contacting a mixture of $C_9$ benzenoid hydrocarbons containing more than 88 weight percent of pseudocumene with thiourea to form an adduct as specified in claim 1; and separating said adduct.
3. Process according to claim 2 wherein the hydrocarbons are $C_9$ alkyl aromatics.
4. Process according to claim 2 wherein the adduct is subsequently decomposed to recover pseudocumene.
5. Process according to claim 2 wherein the thiourea is in combination with a solvent selected from the group consisting of aliphatic alcohol containing 1 to 3 carbon atoms or a dialkyl ketone containing 3 or 4 carbon atoms.
6. Process according to claim 5 wherein the solvent is methanol.
7. Process according to claim 4 wherein the pseudocumene recovered from the adduct is contacted with additional thiourea to form a stable adduct with pseudocumene, and the latter adduct is separated and decomposed to recover further concentrated pseudocumene.

References Cited

UNITED STATES PATENTS 3,222,349  12/1965  Holder _____ 260—96.5 T

FOREIGN PATENTS 505,855  9/1954  Canada _____ 260—96.5 R

LEON ZITVER, Primary Examiner

M. W. GLYNN, Assistant Examiner

U.S. Cl. X.R.

260—668 R